United States Patent
Schimanski et al.

(10) Patent No.: US 9,246,322 B2
(45) Date of Patent: Jan. 26, 2016

(54) SURGE PROTECTION DEVICE

(75) Inventors: Joachim Schimanski, Detmold (DE); Martin Wetter, Detmold (DE); Gerhard Wolff, Extertal (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 195 days.

(21) Appl. No.: 13/877,556

(22) PCT Filed: Sep. 27, 2011

(86) PCT No.: PCT/EP2011/066739
§ 371 (c)(1), (2), (4) Date: Oct. 14, 2013

(87) PCT Pub. No.: WO2012/045610
PCT Pub. Date: Apr. 12, 2012

(65) Prior Publication Data
US 2014/0029149 A1    Jan. 30, 2014

(30) Foreign Application Priority Data
Oct. 4, 2010    (DE) .......................... 10 2010 047 244

(51) Int. Cl.
*H02H 7/24*    (2006.01)
*H02H 3/08*    (2006.01)
*H01T 1/14*    (2006.01)
*H02H 3/02*    (2006.01)

(52) U.S. Cl.
CPC ................. *H02H 3/085* (2013.01); *H01T 1/14* (2013.01); *H02H 3/025* (2013.01)

(58) Field of Classification Search
USPC ................................................ 361/127, 112
See application file for complete search history.

(56) References Cited

U.S. PATENT DOCUMENTS

| | | | | |
|---|---|---|---|---|
| 3,742,419 A | * | 6/1973 | Martzloff | H01C 7/102 338/20 |
| 4,068,281 A | | 1/1978 | Harnden | |
| 4,494,163 A | * | 1/1985 | Yelland et al. | 361/56 |
| 4,635,158 A | * | 1/1987 | Riley | 361/111 |
| 4,688,135 A | * | 8/1987 | Leopold | H01R 13/6666 340/638 |
| 5,134,371 A | * | 7/1992 | Watanabe | G01R 33/09 324/174 |

(Continued)

FOREIGN PATENT DOCUMENTS

| | | |
|---|---|---|
| DE | 4127457 | 4/1992 |
| DE | 19751470 | 6/1999 |

(Continued)

OTHER PUBLICATIONS

Office Action received from European Patent Office (EPO) in European counterpart application No. 11 761 377, dated Sep. 5, 2014, 4 pgs.

(Continued)

*Primary Examiner* — Ronald W Leja
(74) *Attorney, Agent, or Firm* — DLA Piper LLP (US)

(57) ABSTRACT

Aspects of the innovations herein relate to surge protection devices. Such surge protection devices may have an arrester. The arrester may produce an equalization between different potentials and arrest a surge current during use. A sensor may be provided on the arrester, said sensor generating an electric switch-off signal. A switching device may receive the switch-off signal and separate the arrester from an electric circuit, the switching device and arrester being arranged in a physically separate manner from each other.

20 Claims, 1 Drawing Sheet

(56) References Cited

U.S. PATENT DOCUMENTS

| | | | | |
|---|---|---|---|---|
| 5,650,772 | A | * | 7/1997 | Schmidt .................... H01T 1/12 324/133 |
| 5,686,835 | A | * | 11/1997 | Watanabe ............... G01R 33/09 324/166 |
| 5,886,515 | A | * | 3/1999 | Kelly ............................ 323/313 |
| 6,038,117 | A | * | 3/2000 | Dullni et al. .................... 361/58 |
| 6,040,971 | A | * | 3/2000 | Martenson et al. ........... 361/118 |
| 6,160,692 | A | * | 12/2000 | Zaretsky ........................ 361/86 |
| 6,850,400 | B2 | | 2/2005 | Bremond |
| 7,483,252 | B2 | * | 1/2009 | de Palma et al. .............. 361/127 |
| 8,378,778 | B2 | * | 2/2013 | Duval et al. ..................... 338/20 |
| 8,780,521 | B2 | * | 7/2014 | Xu ................................ 361/127 |
| 2002/0024792 | A1 | * | 2/2002 | Cantagrel ..................... 361/127 |
| 2004/0169249 | A1 | * | 9/2004 | Parsons ......................... 257/468 |
| 2006/0254502 | A1 | * | 11/2006 | Garrou et al. .................. 117/84 |
| 2007/0076218 | A1 | * | 4/2007 | Van Empel et al. ........... 356/509 |
| 2009/0103218 | A1 | | 4/2009 | Ryan et al. |
| 2012/0324928 | A1 | * | 12/2012 | Durham et al. ................. 62/129 |

FOREIGN PATENT DOCUMENTS

| | | |
|---|---|---|
| DE | 102007051854 | 5/2009 |
| DE | 102008013447.1 | 9/2009 |
| EP | 0350477 | 1/1990 |
| EP | 0576395 | 6/1993 |
| EP | 1447831 | 8/2004 |
| RU | 70055 U1 | 1/2008 |
| WO | WO 2008/080667 | 7/2008 |

OTHER PUBLICATIONS

Office Action received from State Intellectual Property Office (SIPO) in Chinese counterpart application No. 201180047444, dated Oct. 11, 2014, 3 pgs.
International Search report issued in PCT/EP2011/066739 dated Nov. 18, 2011.
International Report on Patentability issued in PCT/EP2011/066739 dated Apr. 9, 2013.
English Language Abstract of EP 1447831 published Aug. 18, 2004.
English Language Abstract of EP 0350477 publisehd Jan. 10, 1990.
English Language Abstract of DE 102007051854 published May 7, 2009.
English Language Abstract of WO 2008/080667 published Jul. 10, 2008.
English Language Abstract of EP 0576395 published Jun. 10, 1993.
English Language Abstract of DE 19751470 published Jun. 2, 1999.
English Language Abstract of DE 102008013447.1 published Sep. 17, 2009.
English Language Abstract of DE 4127457 published Apr. 30, 1992.
Office Action received from the Federal Service for Intellectual Property of the Russian federation (ROSPATENT), dated Feb. 26, 2015, as well as English-language translation/summary thereof, 6 pages.
Machine Translation of RU 70055 U1 into English language, printed May 12, 2015.

* cited by examiner

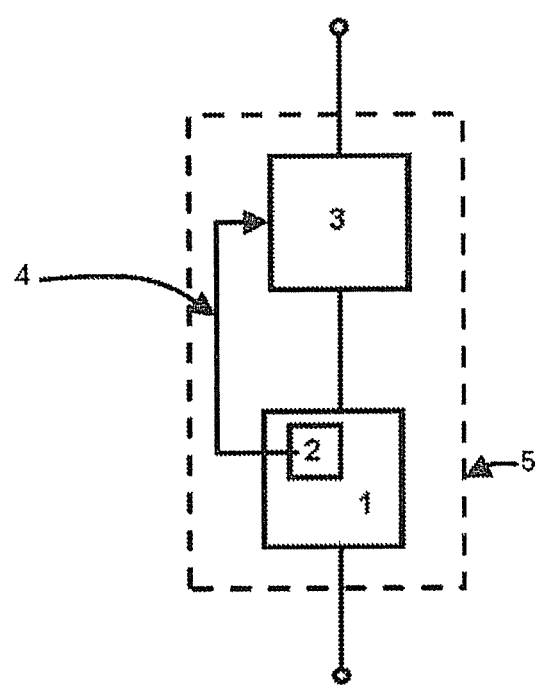

SURGE PROTECTION DEVICE

CROSS REFERENCE TO RELATED APPLICATIONS

This application is a U.S. National Stage Application of International Application No. PCT/EP2011/066739 filed Sep. 27, 2011, which claims priority from German Patent Application No. 10 2010 047 244.1 filed Oct. 4, 2010. The entirety of all the above-listed applications are incorporated herein by reference.

The invention relates to a surge protection device

In the case of a transient surge or a lightning current discharge, the arrester should arrest the occurring high voltages and/or currents with respect to earth in order to protect grid areas arranged after the arrester against the high currents and/or voltages.

It is known that the arrester can be strongly heated inadmissibly by (multiple) arresting processes or particularly high surge currents and/or surge voltages as a result of overload or as a result of ageing processes.

An integrated "temperature safeguard" is therefore generally provided not just for fire protection reasons and in such cases separates or short circuits the surge arrester from the grid.

In order to identify the increased temperature of the arrester and to intercept it by means of circuitry, sensors based on melting solders are generally used in a substantially mechanical disconnection process (for example see DE 10 2007 051 854).

Here, it is disadvantageous in the event of a separation that an electric arc is formed at the switching element, in particular with high grid follow currents, said electric arc possibly causing further damage and also being difficult to control. As a result, an immediate separation of the heated arrester from the grid, which is actually desired, may be prevented.

With alternating currents, this electric arc is not generally too much of a problem, since the electric arc is extinguished, virtually automatically, within a half period of the alternating current, specifically when the current is equal to "zero", that is to say at the zero crossing of the alternating current.

By contrast, such a zero crossing is not provided with direct current applications.

There is thus no possibility of automatic extinction for electric arcs with direct current with the known arresters.

This is then particularly a problem when the direct voltages are very high, for example as in photovoltaic applications (see also DE 10 2007 015 933).

Photovoltaic applications on the whole present a challenge since photovoltaic installations are generally located in an exposed position on the roof. Here, they are to be protected in particular against lightning strikes. Furthermore, the inverters to be found in these installations are susceptible to coupled-in surges.

It should also be mentioned that surge protection devices for arresters of the above-mentioned mechanically integrated type become significantly more expensive with increasing power switching capabilities.

The objective of the invention is to provide a surge protection device that avoids one or more disadvantages from the prior art.

The object is achieved by a surge protection device according to claim 1. Further advantageous embodiments are disclosed in the dependent claims and in the following description.

The invention will be explained in greater detail hereinafter on the basis of FIG. 1.

FIG. 1 shows an exemplary, highly schematic circuit arrangement according to the invention.

In one embodiment of the invention, the surge protection device 5 comprises an arrester 1, wherein the arrester 1 should arrest a surge or a surge current, for example with respect to earth, that is to say it should produce an equalisation between different potentials and arrest a surge current, during use. Here, a sensor 2 is provided on the arrester 1, wherein the sensor 2 generates an electrical disconnection signal 4. An external switching device 3, as considered relative to the arrester 1, receives the electrical disconnection signal 4 and then separates the arrester from an electric circuit, wherein the switching device 3 and the arrester 1 are arranged so as to be spatially separated.

Here, a sensor 2 can be implemented for example by a bridge circuit, in particular a Wheatstone bridge, a temperature sensor, a pressure sensor, a thermal separation auxiliary contact, or a combination thereof.

In a further development of the invention, the sensor 2 comprises a bridge circuit, which for example controls a comparator, a threshold value switch, an amplifier switch or the like.

This sensor 2 may comprise a resistance bridge for example.

Here, the provision of a sensor 2 with at least one thermally varying resistor (PTC, NTC) is particularly expedient. Expedient arrangements include Wheatstone bridges for example.

The sensor 2 is advantageously to be designed so it can be powered by an external power supply so that the switching behaviour is independent of the connected grid portion. This power supply can also be formed in a battery-supported manner.

Here, a switching device 3 can be implemented for example by a mechanical or semiconductor-based DC load break switch or DC circuit breaker.

In a further development of the invention, the electrical disconnection signal 4 is provided to other devices for disconnection or for evaluation. This signal 4 can be used both for signaling and for disconnection of larger installations. Furthermore, the signal 4 can be used for early warning, remote warning, triggering of a switching device 3, and triggering of a disconnection switch 3 in direct voltage applications, in particular in photovoltaic installations.

An arrester 1 can be implemented for example by a varistor, a spark gap, a semiconductor component, or a combination thereof and for example may be a type 1 lightning stroke current arrester.

In the presented surge protection device 5 according to the invention the switching process is triggered purely electrically 4 so that previous disadvantages from the prior art, in particular with regard to the stability of contact points in the event of a mechanical separation or with regard to the costs or with regard to the direct current extinction capability, are avoided.

It is particularly advantageous if the surge protection device 5 can revert to existing switching elements 3.

It goes without saying that not only can the arrester 1 to be protected be separated by means of the switching device 3, but also a more complex installation.

Furthermore, a sensor output of an existing arrester 1, in particular a provided auxiliary contact of the arrester, can be used as an electromechanical switching means for the electrical control 4 of the switching device 3.

In this case, an electromechanical switching means 2 can be provided for example, which generates an electric signal 4 from a mechanical disconnection process, said signal being used for disconnection.

This is then particularly advantageous when a separating device 1 with signaling output is already provided. This signaling output 2 converts a mechanical switching signal into an electrical signal 4. As a result, cost-effective retrofitting can be enabled for direct voltage installations, wherein the existing switching device 3 is then triggered with electrical control 4 by means of an existing arrester 1, but extinction is still implemented. Here, it is possible to revert to either an existing auxiliary contact of the arrester 1 and/or a retrofitted sensor 2.

As a result of the use of a DC load break switch or DC circuit breaker 3, which is controlled electrically 4, the invention makes it possible to provide a cost-effective device 5, which can revert to a cost-effective arrester 1 and DC load break switch or DC circuit breaker 3.

The sensor 2 and the arrester can also be formed easily in an integrated manner.

LIST OF REFERENCE SIGNS arrester 1
sensor 2
switching device 3
disconnection signal 4
surge protection device 5

The invention claimed is:

1. A surge protection device comprising:
an arrester comprising a spark gap, wherein the arrester produces an equalization between different potentials and arrests a surge current during use,
wherein a sensor is provided on the arrester, wherein the sensor generates an electrical disconnection signal,
wherein a switching device receives the disconnection signal and electrically separates the arrester from an electric circuit, wherein the switching device and the arrester are arranged so as to be spatially separated from one another;
wherein the sensor comprises a bridge circuit; and
wherein the bridge circuit is implemented as a Wheatstone bridge.

2. The surge protection device according to claim 1, wherein the sensor comprises an electromechanical switching device.

3. The surge protection device according to claim 2, wherein the switching device is a DC load break switch or a DC circuit breaker.

4. The surge protection device according to claim 3, wherein the sensor comprises at least one thermally varying resistor.

5. The surge protection device according to claim 4, wherein the arrester further comprises one or both of a varistor and a semiconductor component.

6. The surge protection device according to claim 1, wherein the sensor comprises a temperature sensor and/or a pressure sensor.

7. The surge protection device according to claim 1, wherein the sensor comprises at least one thermally varying resistor.

8. The surge protection device according to claim 1, wherein the sensor can be powered by an external power supply.

9. The surge protection device according to claim 8, wherein the sensor comprises at least one thermally varying resistor.

10. The surge protection device according to claim 9, wherein the electrical disconnection signal is provided to other devices for disconnection or for evaluation.

11. The surge protection device according to claim 10, wherein the arrester further comprises a varistor or a semiconductor component.

12. The surge protection device according to claim 11, wherein the sensor further comprises an electromechanical switching device.

13. The surge protection device according to claim 12, wherein the sensor further comprises a temperature sensor or a pressure sensor.

14. The surge protection device according to claim 13 wherein the switching device is a DC load break switch or a DC circuit breaker.

15. The surge protection device according to claim 14 wherein the sensor comprises a temperature sensor and a pressure sensor.

16. The surge protection device according to claim 15 wherein the arrester further comprises both a varistor and a semiconductor component.

17. The surge protection device according to claim 16 wherein the switching device is a DC circuit breaker.

18. The surge protection device according to claim 1, wherein the switching device is a DC load break switch or a DC circuit breaker.

19. The surge protection device according to claim 1, wherein the electrical disconnection signal is provided to other devices for disconnection or for evaluation.

20. The surge protection device according to claim 1, wherein the arrester further comprises one or both of a varistor and a semiconductor component.

* * * * *